US012157240B2

(12) United States Patent
Dyer

(10) Patent No.: US 12,157,240 B2
(45) Date of Patent: Dec. 3, 2024

(54) SEVERING A CABLE TIE WITH A ROUNDED CUT

(71) Applicant: HellermannTyton Corporation, Milwaukee, WI (US)

(72) Inventor: Edward P. Dyer, Germantown, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 358 days.

(21) Appl. No.: 17/664,560

(22) Filed: May 23, 2022

(65) Prior Publication Data

US 2023/0128208 A1 Apr. 27, 2023

Related U.S. Application Data

(60) Provisional application No. 63/271,951, filed on Oct. 26, 2021.

(51) Int. Cl.
*B65B 13/14* (2006.01)
*B26B 13/14* (2006.01)

(52) U.S. Cl.
CPC .................................... *B26B 13/14* (2013.01)

(58) Field of Classification Search
CPC . B23D 35/00; B21F 9/00; B21F 11/00; Y10T 83/9454; B26B 13/14; B65B 13/025; B65B 13/027; B65B 13/04; B65B 13/06; B65B 13/08; B65B 13/16
USPC ....................... 140/123.6, 93.2, 93.4; 30/125
See application file for complete search history.

(56) References Cited

U.S. PATENT DOCUMENTS

| | | | |
|---|---|---|---|
| 3,865,156 | A | 2/1975 | Moody et al. |
| 4,371,010 | A | 2/1983 | Hidassy |
| 4,495,972 | A | 1/1985 | Walker |
| 4,534,817 | A | 8/1985 | O'Sullivan |
| 4,790,225 | A | 12/1988 | Moody et al. |
| 4,793,385 | A | 12/1988 | Dyer et al. |
| D306,390 | S | 3/1990 | Dyer |
| 4,997,011 | A | 3/1991 | Dyer et al. |

(Continued)

FOREIGN PATENT DOCUMENTS

| | | |
|---|---|---|
| CN | 1100054 | 3/1995 |
| CN | 1572657 | 2/2005 |

(Continued)

OTHER PUBLICATIONS

"Extended European Search Report", EP Application No. 22184450.9, Apr. 20, 2023, 8 pages.

(Continued)

*Primary Examiner* — Phong H Nguyen
(74) *Attorney, Agent, or Firm* — Colby Nipper PLLC

(57) ABSTRACT

A cable tie cutting apparatus comprises a housing and a nosepiece assembly coupled to the housing. The nosepiece assembly comprises an upper portion, and a side portion and a front portion orthogonal to and extending from the upper portion. The front portion comprises a receiving element configured to receive a tail portion of a cable tie through a slotted opening and a vertical rail protruding from the front portion. The tool further comprises the blade member having a curved cutting edge and a rear planar surface that defines a channel that mates with the vertical rail of the nosepiece assembly.

9 Claims, 6 Drawing Sheets

(56) References Cited

U.S. PATENT DOCUMENTS

| | | | | |
|---|---|---|---|---|
| 5,205,328 | A | 4/1993 | Johnson | |
| 5,287,802 | A | 2/1994 | Pearson | |
| 5,492,156 | A | 2/1996 | Dyer et al. | |
| 5,595,220 | A | 1/1997 | Leban et al. | |
| 5,769,133 | A | 6/1998 | Dyer et al. | |
| 5,809,873 | A | 9/1998 | Chak et al. | |
| 5,909,751 | A | 6/1999 | Teagno | |
| 5,915,425 | A | 6/1999 | Nilsson et al. | |
| 5,921,290 | A | 7/1999 | Dyer et al. | |
| D430,781 | S | 9/2000 | Hillegonds | |
| 6,206,053 | B1 * | 3/2001 | Hillegonds | B65B 13/027 140/93.2 |
| 6,302,157 | B1 | 10/2001 | Deschenes et al. | |
| 6,354,336 | B1 | 3/2002 | Leban | |
| 6,401,766 | B1 | 6/2002 | Ishikawa | |
| 6,497,258 | B1 | 12/2002 | Flannery et al. | |
| D473,773 | S | 4/2003 | Hillegonds et al. | |
| 6,543,341 | B2 | 4/2003 | Lopez | |
| D491,430 | S | 6/2004 | Magno et al. | |
| 6,751,828 | B2 | 6/2004 | Matschiner et al. | |
| 6,840,289 | B2 | 1/2005 | Hillegonds | |
| D510,244 | S | 10/2005 | Magno et al. | |
| 7,124,787 | B2 | 10/2006 | Lueschen | |
| 7,165,379 | B1 | 1/2007 | Lai | |
| 7,210,506 | B2 | 5/2007 | Magno | |
| 7,216,679 | B2 | 5/2007 | Magno et al. | |
| D543,811 | S | 6/2007 | Lueschen | |
| 7,231,944 | B2 | 6/2007 | Magno et al. | |
| D547,626 | S | 7/2007 | Lueschen et al. | |
| 7,299,830 | B2 * | 11/2007 | Levin | B65B 13/027 140/93.2 |
| 7,591,451 | B2 * | 9/2009 | Dyer | B65B 13/025 254/245 |
| 8,240,343 | B2 | 8/2012 | Dyer et al. | |
| D692,738 | S | 11/2013 | Dyer | |
| 8,955,556 | B2 | 2/2015 | Myers et al. | |
| 8,960,241 | B2 | 2/2015 | Dyer | |
| D732,361 | S | 6/2015 | Dyer | |
| D755,029 | S | 5/2016 | Myers et al. | |
| D758,155 | S | 6/2016 | Kruzel | |
| 9,394,067 | B2 | 7/2016 | Dyer | |
| 9,394,068 | B2 | 7/2016 | Dyer | |
| 9,481,102 | B1 * | 11/2016 | Hojnacki | B65B 13/027 |
| 9,550,590 | B2 | 1/2017 | Dyer | |
| 9,694,924 | B2 | 7/2017 | Myers et al. | |
| D818,787 | S | 5/2018 | Kitago | |
| D856,101 | S | 8/2019 | Kitago | |
| D878,177 | S | 3/2020 | Kitago | |
| D885,861 | S | 6/2020 | Ni | |
| 11,008,123 | B2 | 5/2021 | Kitago | |
| 11,008,124 | B2 | 5/2021 | Kitago | |
| 11,027,902 | B2 | 6/2021 | Geiger et al. | |
| 11,511,894 | B2 | 11/2022 | Hempe et al. | |
| 11,827,394 | B2 | 11/2023 | Hempe et al. | |
| D1,012,641 | S | 1/2024 | Dyer | |
| 2002/0093211 | A1 | 7/2002 | Filipiak et al. | |
| 2002/0108664 | A1 | 8/2002 | Kurmis | |
| 2002/0108666 | A1 | 8/2002 | Kurmis | |
| 2002/0108667 | A1 | 8/2002 | Thieme | |
| 2002/0108668 | A1 | 8/2002 | Thieme | |
| 2002/0129866 | A1 | 9/2002 | Czebatul et al. | |
| 2003/0136278 | A1 | 7/2003 | Miyazaki et al. | |
| 2004/0079436 | A1 | 4/2004 | Hillegonds | |
| 2004/0244606 | A1 | 12/2004 | Haberstroh et al. | |
| 2004/0244866 | A1 | 12/2004 | Ishikawa et al. | |
| 2005/0178460 | A1 | 8/2005 | Magno | |
| 2005/0178461 | A1 | 8/2005 | Magno et al. | |
| 2006/0011254 | A1 | 1/2006 | Yokochi et al. | |
| 2006/0037661 | A1 * | 2/2006 | Lueschen | B65B 13/027 140/123.6 |
| 2007/0157555 | A1 | 7/2007 | Tanner | |
| 2007/0199610 | A1 | 8/2007 | Itagaki | |
| 2008/0035232 | A1 | 2/2008 | Levin et al. | |
| 2009/0121069 | A1 | 5/2009 | Dyer et al. | |
| 2013/0167698 | A1 | 7/2013 | Dyer | |
| 2013/0167969 | A1 | 7/2013 | Myers et al. | |
| 2013/0167970 | A1 | 7/2013 | Dyer | |
| 2015/0053300 | A1 | 2/2015 | Myers et al. | |
| 2015/0151862 | A1 | 6/2015 | Kitago | |
| 2015/0239588 | A1 | 8/2015 | Kitago | |
| 2016/0016682 | A1 | 1/2016 | Boss et al. | |
| 2016/0046398 | A1 | 2/2016 | Neeser et al. | |
| 2016/0075456 | A1 | 3/2016 | Nomura et al. | |
| 2016/0167813 | A1 | 6/2016 | Myers | |
| 2016/0230907 | A1 | 8/2016 | Kitago | |
| 2016/0280405 | A1 | 9/2016 | Thieme et al. | |
| 2017/0057674 | A1 | 3/2017 | Myers | |
| 2017/0174374 | A1 | 6/2017 | Figiel et al. | |
| 2017/0334587 | A1 | 11/2017 | McFall et al. | |
| 2019/0106231 | A1 | 4/2019 | Schwinn et al. | |
| 2019/0127095 | A1 | 5/2019 | Kitago | |
| 2019/0144149 | A1 | 5/2019 | Dohrmann et al. | |
| 2019/0210749 | A1 | 7/2019 | Kitago | |
| 2021/0094713 | A1 | 4/2021 | Hempe et al. | |
| 2023/0060775 | A1 | 3/2023 | Hempe et al. | |
| 2023/0331412 | A1 | 10/2023 | Fukuda et al. | |

FOREIGN PATENT DOCUMENTS

| | | |
|---|---|---|
| CN | 1660675 | 8/2005 |
| CN | 101486385 | 7/2009 |
| CN | 101585419 | 11/2009 |
| CN | 101983159 | 3/2011 |
| CN | 102859821 | 1/2013 |
| CN | 202670128 | 1/2013 |
| CN | 104870315 | 8/2015 |
| CN | 206579887 | 10/2017 |
| CN | 108791998 | 11/2018 |
| DE | 69728071 | 2/2005 |
| DE | 102014103334 | 9/2015 |
| EP | 0722885 | 7/1996 |
| EP | 0839717 | 5/1998 |
| EP | 1564146 | 8/2005 |
| EP | 3068693 | 1/2019 |
| EP | 3466819 | 11/2020 |
| EP | 3483075 | 12/2020 |
| JP | H09240617 | 9/1997 |
| JP | 2000103407 | 4/2000 |
| KR | 102267779 | 6/2021 |
| WO | 9815458 | 4/1998 |
| WO | 2009152707 | 12/2009 |
| WO | 2015067444 | 5/2015 |

OTHER PUBLICATIONS

"Foreign Office Action", CN Application No. 202011032227.6, Jun. 7, 2022, 55 pages.
"Foreign Office Action", CN Application No. 202011032227.6, Nov. 3, 2022, 7 pages.
"Non-Final Office Action", U.S. Appl. No. 18/049,821, filed Mar. 31, 2023, 9 pages.
"Notice of Allowance", U.S. Appl. No. 16/163,677, filed Aug. 25, 2022, 11 pages.
"Notice of Allowance", U.S. Appl. No. 17/009,628, filed Jul. 29, 2022, 8 pages.
"Notice of Allowance", U.S. Appl. No. 18/049,821, filed Aug. 9, 2023, 8 pages.
"Notice of Allowance", U.S. Appl. No. 29/812,879, filed Aug. 17, 2023, 6 pages.
"Non-Final Office Action", U.S. Appl. No. 29/812,879, filed May 8, 2023, 5 pages.
Hellermantyton, "EVO 7 Series & 7i Series Nosepiece, 1/Pkg", Retrieved at: https://www.hellermanntyton.us/products/110-70011/ on Mar. 30, 2022, 1 page.
Hellermantyton, "EVO 7 Series & 7i Series Nosepiece, 1mm tail, 1/pkg", Retrieved at: https://www.hellermanntyton.us/products/110-70131/ on Mar. 30, 2022, 1 page.
Hellermantyton, "EVO 7 Series & 7i Series Nosepiece, 2mm tail, 1/pkg", Retrieved at: https://www.hellermanntyton.us/products/110-70132/ on Mar. 30, 2022, 1 page.

(56) References Cited

OTHER PUBLICATIONS

Hellermantyton, "EVO 7 Series & 7i Series Nosepiece, 3mm tail, 1/pkg", Retrieved at: https://www.hellermanntyton.us/products/110-70133/ on Mar. 30, 2022, 1 page.
Hellermantyton, "EVO 9 and EVO 9i 2mm Nosepiece, Extended Tail, 1/pkg", Retrieved at: https://www.hellermanntyton.us/products/110-80064/ on Mar. 30, 2022, 1 page.
Hellermantyton, "EVO 9 and EVO 9i 3mm Nosepiece, Extended Tail, 1/pkg", Retrieved at: https://www.hellermanntyton.us/products/110-80065/ on Mar. 30, 2022, 1 page.
Hellermantyton, "EVO 9 and EVO 9i 4mm Nosepiece, Extended Tail, 1/pkg", Retrieved at: https://www.hellermanntyton.us/products/110-80066/ on Mar. 30, 2022, 1 page.
Hellermantyton, "EVO 9 and EVO 9i 5mm Nosepiece, Extended Tail, 1/pkg", Retrieved at: https://www.hellermanntyton.us/products/110-80067/ on Mar. 30, 2022, 1 page.
Hellermantyton, "EVO 9 Nosepiece Flush Cut, Replacement Part, 1/pkg", Retrieved at: https://www.hellermanntyton.us/products/110-80018/ on Mar. 30, 2022, 1 page.
"Autotool 2000 CPK Operating Instructions", Hellerman Tyton, 106-29006, Apr. 2, 2015, 29 pages.
"Extended European Search Report", EP Application No. 18192166.9, Jan. 15, 2019, 5 pages.
"Extended European Search Report", EP Application No. 20198300.4, May 20, 2021, 11 pages.
"Final Office Action", U.S. Appl. No. 16/120,926, filed Feb. 17, 2022, 13 pages.
"Final Office Action", U.S. Appl. No. 16/120,926, filed Nov. 15, 2021, 18 pages.
"Foreign Office Action", CN Application No. 201811344796.7, Jan. 26, 2021, 7 pages.
"Foreign Office Action", CN Application No. 201811167015.1, Apr. 24, 2020, 18 pages.
"Foreign Office Action", CN Application No. 201811167015.1, Jun. 2, 2021, 7 pages.
"Foreign Office Action", CN Application No. 202011032227.6, Jun. 7, 2022, 58 pages.
"Foreign Office Action", CN Application No. 201811344796.7, Jun. 28, 2020, 17 pages.
"Foreign Office Action", CN Application No. 201811167015.1, Dec. 11, 2020, 14 pages.
"Foreign Office Action", CN Application No. 202011032227.6, Dec. 16, 2021, 23 pages.
"Non-Final Office Action", U.S. Appl. No. 17/009,628, filed Mar. 11, 2022, 23 pages.
"Non-Final Office Action", U.S. Appl. No. May 27, 2020, 13 pages.
"Non-Final Office Action", U.S. Appl. No. 16/163,677, filed Jun. 1, 2020, 14 pages.
"Non-Final Office Action", U.S. Appl. No. 16/163,677, filed Jun. 10, 2022, 15 pages.
"Non-Final Office Action", U.S. Appl. No. 17/009,628, filed Nov. 29, 2021, 20 pages.
"Non-Final Office Action", U.S. Appl. No. 16/163,677, filed Dec. 7, 2021, 19 pages.
"Partial European Search Report", EP Application No. 20198300.4, Feb. 18, 2021, 12 pages.
"Today's Mechanisms Mini Test", 4CR—Technological Studies—Retrieved at: gwcts3.blogspot.com/2011/09/todays-mechanisms-mini-test.html—on Nov. 19, 2021, Sep. 16, 2011, 3 pages.
Pishehvari, et al., "Ego-pose estimation via Radar and Openstreetmap-based Scan matching", May 2018, 8 pages.

* cited by examiner

SEVERING A CABLE TIE WITH A ROUNDED CUT

RELATED APPLICATION

This application claims benefit under 35 U.S.C. § 119(e) to U.S. Provisional Patent Application 63/271,951, filed on Oct. 26, 2021, which is incorporated herein by reference in its entirety.

BACKGROUND

Many systems require the use of wires to interconnect cooperating subsystems thereby necessitating complex wiring schemes within limited spatial constraints. Debugging or repairing a connection may require visual inspection including using a person's hands to touch, grab, and otherwise navigate physical features in various applications. Cable ties are often used to bundle wires, cables, or other objects together as a way to perform cable management to group and organize the items. However, severed cable ties may contain sharp edges that can cause abrasive damage to clothing or injuries when touching, grabbing, or otherwise working in and around these and other physical features of a system.

SUMMARY

This document describes techniques, apparatuses, and systems for severing a cable tie with a protruding rounded cut. For example, the techniques may utilize a cable tie severing tool to produce a rounded cut on a serrated strap portion of a cable tie. The cable tie may be looped around an object, which may be elongated or bundled, such as, a group of wires or cables. A tail portion of the cable tie is at an opposite end as its head portion; the serrated portion is in between the head and the tail portions. The tail portion is received through a nosepiece assembly of the tool. The head of the cable tie may be aligned with the nosepiece assembly and a blade member of the tool, to ensure a round cut of the serrated portion, at a finite distance from the head portion. To this effect, the blade member may be displaced during activation of the tool, with sufficient force to sever the serrated portion and produce a rounded cut free of sharp edges. Also, having made at the finite distance to ensure a consistent amount of the serrated portion remains after the cut, to help keep the loop secure. By utilizing the techniques, apparatuses, and systems described herein, the likelihood of abrasive damage caused by severed ends of cable ties may be reduced.

In one example, a tool comprises a housing and a nosepiece assembly coupled to the housing. The nosepiece assembly comprises an upper portion, a side portion orthogonal to and extending from the upper portion, and a front portion orthogonal to and extending from the upper portion. The front portion comprises a receiving element configured to receive a tail portion of a cable tie through a slotted opening that has a width of at least a width of the tail portion of the cable tie, and a vertical rail protruding from the front portion and configured to be mated with a channel of a blade member. The tool further comprises the blade member configured to produce a rounded cut along the serrated portion of the cable tie at a finite distance from a head portion of the cable tie and comprising a rear planar surface that defines the channel that mates with the vertical rail of the nosepiece assembly, and a cutting edge including a sharp curve beginning and ending at the rear planar surface of the blade member.

In another example, an apparatus comprises a nosepiece assembly configured to be coupled to a housing of a tool for severing a serrated portion of a cable tie with a rounded cut at a finite distance from a head portion of the cable tie. The nosepiece assembly comprises an upper portion, a side portion orthogonal to and extending from the upper portion, and a front portion orthogonal to and extending from the upper portion. The front portion comprises a receiving element configured to receive a tail portion of a cable tie through a slotted opening that has a width of at least a width of the tail portion of the cable tie, and a vertical rail protruding from the front portion and configured to be mated with a channel of a blade member.

In another example, an apparatus comprises a blade member configured to produce a rounded cut along a serrated portion of a cable tie at a finite distance from a head portion of the cable tie. The blade member comprises a rear planar surface having a channel recessed from the rear planar surface that mates with a vertical rail of a nosepiece assembly, and a cutting edge including a sharp curve beginning and ending at the rear planar surface of the blade member.

In aspects, the techniques, apparatuses, and systems for severing a cable tie with a round cut are described with respect to individual elements of a cable tie severing tool, including a widely compatible nosepiece assembly, blade member, and securing element. As such, it should be understood that the above individual elements may be utilized to provide specific functions usable in whole or partial combination with each other and a plethora of widely compatible cable tie severing tools. Further, additional aspects of the one or more elements for severing a cable tie with a round cut are described below.

This Summary introduces simplified concepts related to severing a cable tie with a round cut as further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of severing a cable tie with a rounded cut are described in this document with reference to the following figures.

The same numbers or similar numbers may be used throughout the drawings to reference like features and components.

DETAILED DESCRIPTION

Overview

Figure 1:
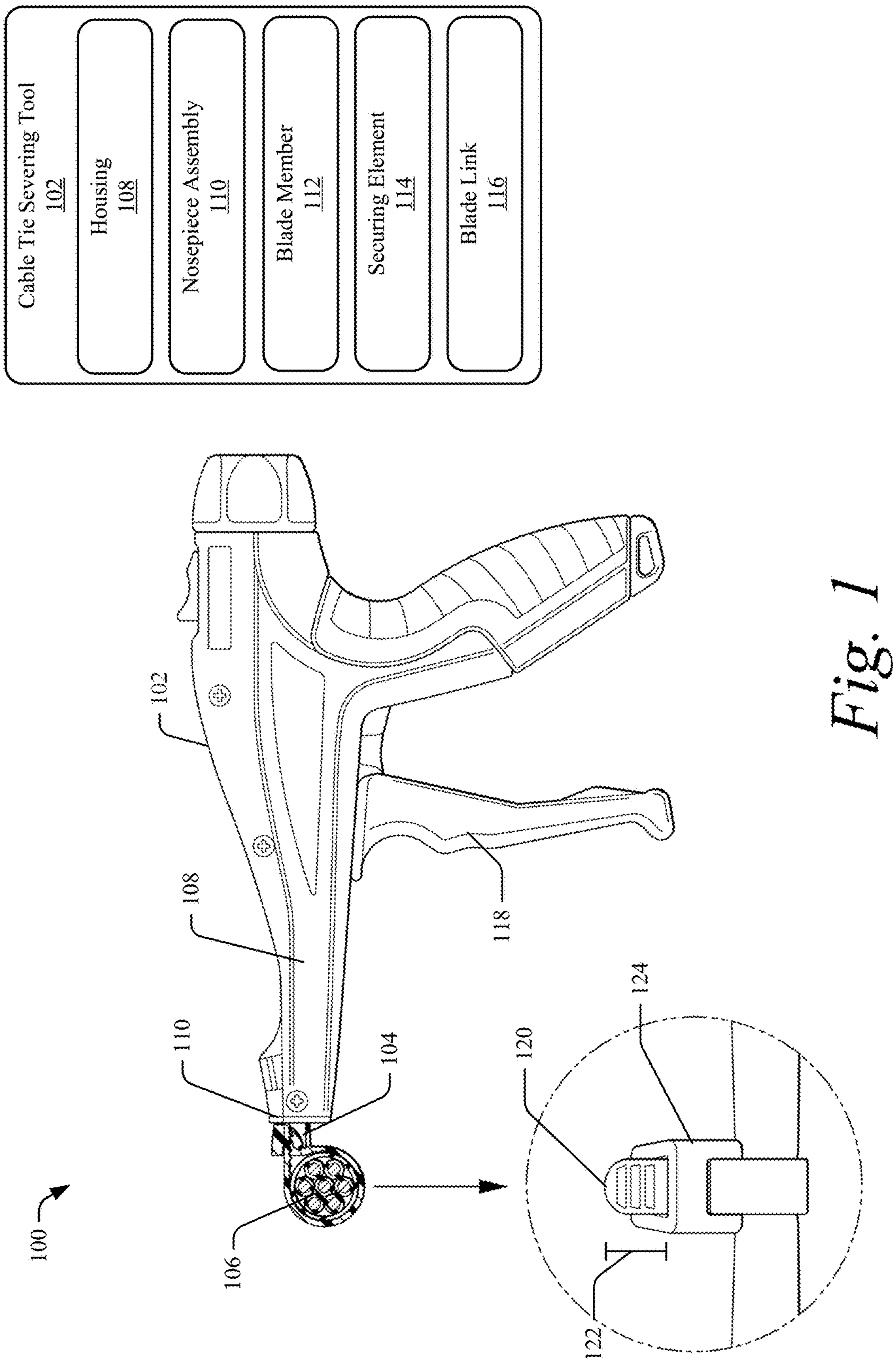
FIG. 1 illustrates an example operating environment for severing a cable tie with a round cut, in accordance with the techniques of this disclosure.

This document describes techniques, apparatuses, and systems for severing a cable tie with a rounded cut. In one example of severing a cable tie with a round cut, a cable tie severing tool is utilized to produce a rounded cut on a serrated portion of a cable tie. In aspects, the cable tie tool includes a nosepiece assembled onto a housing. In addition, a blade member may attach to the nosepiece assembly and connect to the housing through a blade link. The elements may be implemented together to function cooperatively. For example, the housing may be configured to receive the nosepiece assembly through one or more securing elements. The nosepiece assembly may receive and align the tail portion of the cable tie to allow the blade member to produce a round cut when actuated by the blade link and initiated or activated by a trigger.

In some examples, the individual elements may operate in whole or partial combination with one another and a number of widely compatible cable tie severing tools. In aspects, the nosepiece assembly can be separated into portions, including an upper portion, a side portion, and a front portion. The upper portion may include top and bottom planar surfaces which mate with the housing. The side portion may include an exterior planar surface orthogonal to and extending from the bottom planar surface of the upper portion. This side portion may be used to secure the nosepiece assembly to the housing. Similarly, the front portion of the nosepiece assembly may be defined to have interior and exterior planar surfaces orthogonal to and extending from the bottom planar surface of the upper portion.

Further, the nosepiece assembly may include one or more elements, such as a receiving element defined at the front portion and configured to receive the tail portion of the cable tie and a side entry to receive the strap with serrations or a vertical rail protruding from the interior planar surface of the front portion and configured to mate to the blade member. The nosepiece assembly may be compatible with a specific securing element that utilizes an exterior portion and an interior portion having a smaller planar surface to secure the nosepiece assembly to the housing. The securing element may include a first boss and a second boss to be installed within openings of the housing. The second boss may additionally include a threaded opening for securing the nosepiece assembly and the securing element to the housing through the use of one or more fasteners (e.g., screws).

While the blade member is described as being configured to mate with a vertical rail of the nosepiece assembly, it is understood that the blade member may be operated in combination with other compatible cable tie severing tools, for example, alternate appropriately configured nosepieces and blade links. The blade member may include a rear planar surface having a recessed channel for mating to vertical rail of the nosepiece. In addition, a blade link opening may be defined through the blade member to initiate movement to utilize a cutting edge of the blade member. In specific, the cutting edge may be implemented as a sharpened edge having a curved shape to produce a round cut. In an aspect, each of the above-mentioned elements functions cooperatively as part of a cable tie severing tool to sever a cable tie with a round cut.

Example Environment

FIG. 1 illustrates an example operating environment 100 for severing a cable tie with a rounded cut. Specifically, a cable tie severing tool 102 is implemented on a cable tie 104 surrounding a group of electrical wires 106. In aspects, the group of wires 106 is one of multiple groups of wires within an electrical system, and in some cases, the group of wires 106 is referred to as a bundle. The use of cable ties is described in the context of cable management, cable ties and cable tie severing tools may be used for various organizational or fastening purposes.

In one example of the cable tie severing tool 102, the tool 102 includes a housing 108, a nosepiece assembly 110 that may be coupled to the housing 108, a blade member 112, a securing element 114, and a blade link 116. In aspects, the nosepiece assembly 110 may be secured to the housing 108 through one or more securing element 114. The one or more securing element 114 may include any number of appropriate fasteners, such as screws, bolt, and the like, or any external element usable to secure the nosepiece assembly 110 to the housing 108.

In one implementation of the cable tie severing tool 102, the housing 108 contains a trigger 118 attached, directly or indirectly, to the blade link 116. In an aspect, the trigger 118 is configured to displace linearly (e.g., horizontally or vertically) or rotate (e.g., clockwise or counterclockwise). The trigger 118 may be attached, directly or through a lever arm, to the blade link 116 connected to the blade member 112. The trigger 118 may be configured to, when moved, cause vertical displacement in the blade link 116 at point connected to the blade member 112. As a result, the blade member 112 may vertically displace and sever the cable tie 104 at a serrated portion.

In an aspect, the cable tie severing tool 102 may be an automatic tool, such that a motor is used to displace the blade member 112. In an aspect, the cable tie 104, when severed, produces a round cut 120 at the serrated portion of the cable tie 104 with the cable tie 104 surrounding the group of electrical wires 106. Accordingly, the round cut 120 may have no sharp edges, and as a result, minimize the likelihood of abrasive damage to servicing technicians and nearby wires. It should be noted that round cut 120 is displaced a finite distance 122 from a head portion 124 of the cable tie 104. In an aspect, the finite distance 122 remaining on the serrated portion of the cable tie 104 may provide additional security to prevent slippage or separation of the cable tie. For example, the distanced cut may ensure that a sufficient number of serrations are engaged to keep the cable tie securely looped. To this effect, severing a cable tie with a round cut may provide increased reliability of the cable tie 104 and minimize abrasive damage, with an additional advantage of providing a cut that conveys through visual inspection, the cable tie loop is secure.

Example System

Figure 2:
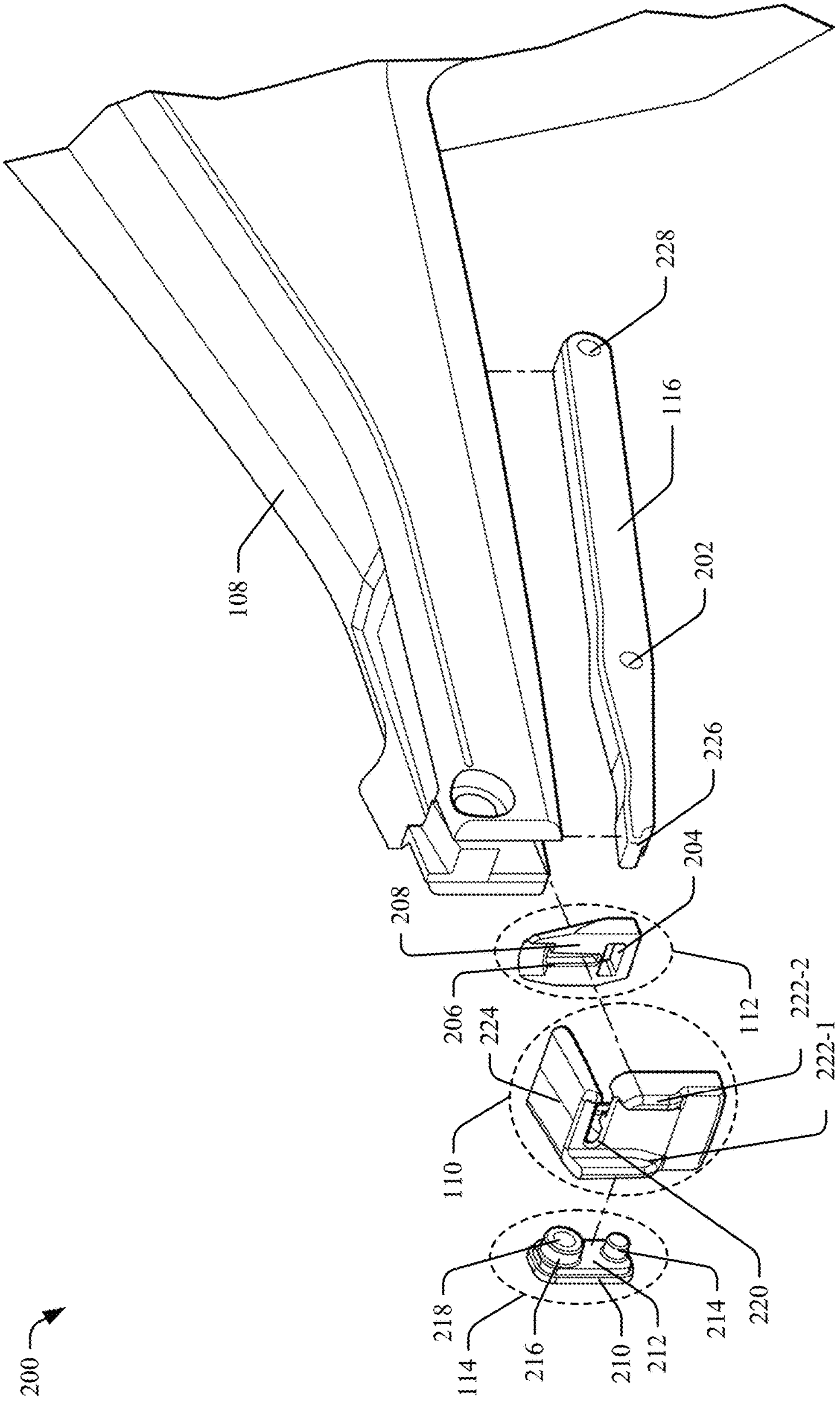
FIG. 2 illustrates an example cable tie severing tool.

FIG. 2 illustrates an example of the cable tie severing tool 200, which is an example of the cable tie severing tool 102. Specifically, the cable tie severing tool 200 includes a housing 108, a nosepiece assembly 110, a blade member 112, a securing element 114, and a blade link 116. To secure the nosepiece assembly 110 to the housing 108, the securing element 114 may be used. In an aspect, the securing element 114 includes an exterior portion 210, an interior portion 212, a first boss 214, and a second boss 216. The exterior portion 210 may create a lip around the interior portion 212 which secures the nosepiece assembly 110 by allowing the interior portion 212, but not the exterior portion 210, to fit within an opening (not shown) of the nosepiece assembly 110.

The first boss 214 and the second boss 216 may each be placed within a separate opening of the housing 108 to secure the nosepiece assembly 110 and the securing element 114 to the housing 108. Either, or both, of the first boss 214 and second boss 216 may contain a threaded hole 218 configured to receive one or more fasteners to secure the securing element 114 and the nosepiece assembly 110 to the housing 108.

It should be noted that while the nosepiece assembly 110 can be secured to the housing 108 through the securing element 114, other implementations may secure the nosepiece assembly 110 to the housing 108 through alternate methods. For example, one or more fasteners may be used to secure the nosepiece assembly 110 to the housing 108. In this implementation, one or more threaded holes may be present within the nosepiece assembly 110, the housing 108, or both.

Once secured to the housing 108, the nosepiece assembly 110 may be utilized to provide various functionality to the cable tie severing tool. For example, the nosepiece assembly 110 may be separated into portions, including an upper portion, a side portion (not shown), and a front portion. The upper portion may include top and bottom planar surfaces, either of which may rest along a portion of the housing. In one example, the bottom planar surface of the upper portion rests on an upper surface of the housing 108. The side portion may include an exterior planar surface orthogonal to and extending from the bottom planar surface of the upper portion. In aspects, the side portion may contain an opening used to secure the nosepiece assembly 110 to the housing. Similarly, the front portion of the nosepiece assembly 110 may be defined to have interior and exterior planar surfaces orthogonal to and extending from the bottom planar surface of the upper portion. Further, the nosepiece assembly 110 may include one or more elements, such as a receiving element 220 defined at the front portion and configured to receive the tail portion of a cable tie.

The nosepiece assembly 110 may include two vertical protrusions 222 (e.g., vertical protrusion 222-1, vertical protrusion 222-2) to align a head portion of the cable tie with the receiving element 220. In some implementations, the vertical protrusions 222 may be tapered to better align the head portion of the cable tie with the receiving element 220. For example, the vertical protrusions 222 may be distanced from one another by at least a width of the head portion of the cable tie at the exterior planar surface of the front portion of the nosepiece assembly 110. The vertical protrusions 222 may be tapered at a distance from the exterior planar surface of the front portion such that the two vertical sections are greater distanced from one another at a greater distance from the exterior planar surface of the front portion. Specifically, the distance between the vertical protrusions 222 may increase gradually along the protrusion from the exterior planar surface of the front portion of the nosepiece assembly 110.

The receiving element 220 of the nosepiece assembly 110 may be used to receive the tail portion of the cable tie. Similarly, the vertical protrusions 222 may be used to guide the tail portion of the cable tie into the receiving element 220. For example, the tapered vertical protrusions 222 may funnel or guide the head portion of the cable tie towards the receiving element 220 until it is flush against the front portion of the nosepiece assembly 110. As a result, the serrated portion of the cable tie may be centered within the receiving element 220. This may allow the blade member 112 to make a symmetric cut, and in some implementation, a semi-circular or near-semi-circular cut. Alignment of the cable tie is particularly important for a semi-circular or near semi-circular cut as misalignment may cause sharp edges on the serrated portion of the cable tie which may result in abrasive damage. Accordingly, multiple alignment methods may be used to ensure the robustness and repeatability of the cable tie severing process.

An alignment indicator 224 may additionally aid in alignment of the head portion of the cable tie. For example, the top planar surface of the upper portion of the nosepiece assembly may contain a mark or protrusion at the center of a width dimension of the top planar surface. This mark may extend along a vertical dimension of the top planar surface. In an aspect, the alignment indicator provides a visual method for aligning the alignment indicator with a center of the head portion of the cable tie, thus aligning the cut. Additionally, the nosepiece assembly 110 may include a vertical rail (not shown) protruding from (a middle section of) the interior planar surface of the front portion and configured to be mated with the blade member 112.

In an aspect, the blade link 116 contains a pin hole 202 that connects the blade link 116 to the housing 108. In some implementations, the blade link 116 is connected, directly or indirectly, to a mechanical trigger (e.g., trigger 118) at a pin hole 228. In this implementation, movement of the trigger causes a vertical displacement of the blade link 116 at an end portion 226. In alternate implementations, the blade link 116 may connect to a motor which drives the displacement of the blade link 116. The blade link 116 may be further connected to a blade member 112 through an opening 204 defined through the blade member 112. In an aspect, the end portion 226 of the blade link 116 may be inserted into the opening 204 of the blade member 112. As a result, vertical displacement of the blade link 116 at the end portion 226 may cause vertical displacement of the blade member 112.

While the vertical displacement of the blade member 112 has been described in context of the blade link 116, it is possible in other implementations to drive displacement the blade member 112 through alternate methods. For example, the blade member 112 may be displaced through the use of mating gears which drive vertical displacement through rotation. Alternatively, or in addition, a motor, electronic circuitry, or other electrical system may be used to drive the displacement of the blade member 112.

Further, the displacement of the blade member 112 may be guided through use of a channel 206 recessed in and defined by a rear planar surface 208 of the blade member 112. For example, the nosepiece assembly 110 may include a vertical rail (not shown) that mates with the channel 206 of the blade member 112. As such, the vertical rail may act to guide the vertical displacement of the blade member 112 using the channel 206.

In an aspect, the head of the cable tie is placed flush against the front portion of the nosepiece assembly 110, which allows the tail portion of the cable tie to be received through the receiving element 220. Due to the curvature of the blade member 112, vertical displacement of the blade member 112 may cause the serrated portion of the cable tie to be severed with a round cut at a finite distance from the head portion of the cable tie. As a result, the cable tie may be more robust in terms of slippage. For example, the cut at a finite distance may allow for an acceptable number of serrations to be engaged to keep the cable tie securely looped. If, for example, only one or two serrations are engaged after a typical application cut, the cable tie may not be or at least may not appear as secure as if additional serrations are available for engagement after the rounded cut. In addition, the nosepiece assembly 110 may provide additional functionality with respect to the blade member 112. For example, the nosepiece assembly 110 may cover the blade member 112 to protect against accidental injury caused by the displacement of the blade member 112 and to protect the blade member 112 from impact.

Example Nosepiece Assembly

Figure 3:
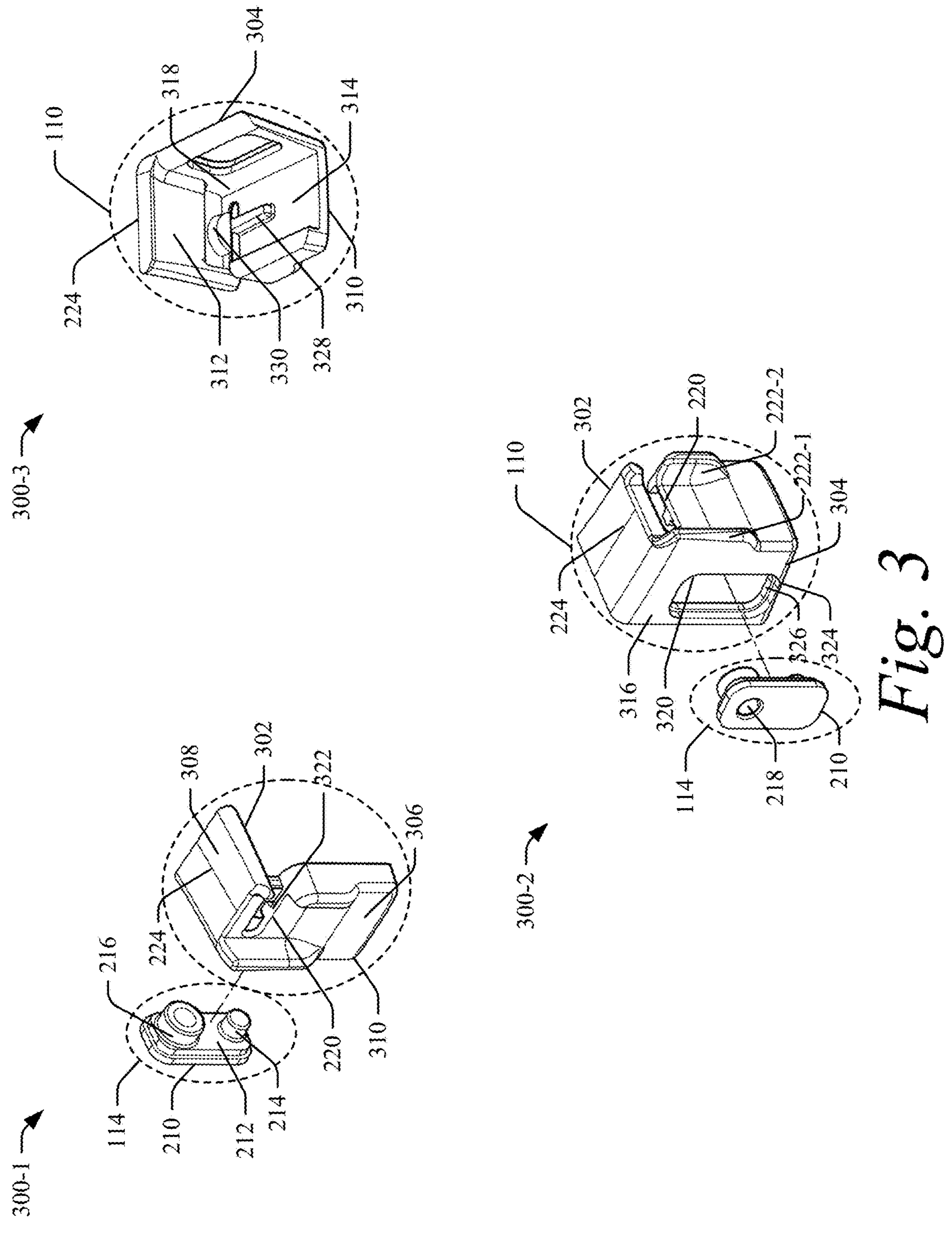
FIG. 3 illustrates example views of a nosepiece assembly and a securing element.

FIG. 3 illustrates example views 300 of a nosepiece assembly 110 and a securing element 114. The first view 300-1 illustrates a left side perspective view of the nosepiece assembly 110 and the securing element 114. The view 300-1 illustrates an upper portion 302 with a top planar surface 308. In an aspect, the top planar surface 308 includes the alignment indicator 224 defined along a length dimension of the top planar surface 308. Additionally, the alignment indicator 224 may be defined to be centered about a width dimension of the top planar surface 308. Alternatively, the alignment indicator 224 may be defined at other locations along the width dimension to align the head portion of the cable tie with the blade member 112 when activated.

Also shown in view 300-1 is an exterior planar surface 306 of a front portion 310 of the nosepiece assembly 110. In an aspect, the exterior planar surface 306 is orthogonal to and extends from a bottom planar surface 312 of the upper portion 302 as shown in a bottom view 300-3 of the nosepiece assembly 110. The bottom planar surface 312 may also include a length dimension and a width dimension.

View 300-3 also illustrates an interior planar surface 314 of the front portion 310 of the cable tie severing tool, which may also be defined by a length dimension and a width dimension. In an aspect, the interior planar surface 314 is orthogonal to and extends from the bottom planar surface 312 of the upper portion 302. The nosepiece assembly 110 may also include a side portion 304 as shown in a right-side perspective view 300-2 containing an exterior planar surface 316 with a length dimension and a width dimension. In an aspect, the exterior planar surface 316 is also orthogonal to and extends from the bottom planar surface 312 (shown in view 300-3) of the upper portion 302. Additionally, the side portion 304 may contain an interior planar surface 318 with a length dimension and a width dimension. In some implementations, the side portion 304 may contain an opening 320 (shown in view 300-2) which may be used to secure the nosepiece assembly 110 to a housing through a securing element 114. In one implementation, the opening 320 may be defined through the side portion 304 and be configured to fit the securing element 114. In other implementations, the opening 320 may include multiple openings usable to secure the nosepiece assembly through one or more fasteners.

The securing element 114 may be a part of or independent from the nosepiece assembly 110. In one implementation, the securing element 114 is an independent structure configured to fit within the opening 320 of the nosepiece assembly 110. In an aspect, the nosepiece assembly 110 includes a counterbore hole with an outer opening 324 and an inner opening 326 within the outer opening 324. In some implementations, the outer opening 324 is defined to have a length dimension and a width dimension, and the inner opening 326 is defined to have a lesser length dimension and a lesser width dimension. In this implementation, the lesser length and lesser width of the inner opening 326 compared to the outer opening 324 creates a lip, which may be used to secure the nosepiece assembly 110 when an independent securing element 114 is used.

The securing element 114 may be configured to fit within the counterbore hole of the opening 320. For example, the securing element 114 (shown in view 300-1) may include an exterior portion 210 having a larger planar surface configured to fit within the outer opening 324 of the nosepiece assembly 110 but not the inner opening 326 of the nosepiece assembly 110. Further, the larger planar surface of the exterior portion 210 of the securing element 114 may be defined by a length dimension and a width dimension lesser than the length and width dimension of the outer opening 324 but greater than the inner opening 326 of the nosepiece assembly 110.

The securing element 114 may additionally include an interior portion 212 protruding from the exterior portion 210 and defined by a smaller planar surface configured to fit within the inner opening 326 of the nosepiece assembly 110. The smaller planar surface may be defined by a length dimension and a width dimension less than that of the inner opening 326 of the nosepiece assembly 110.

One or more bosses may extend from the interior portion 212 of the securing element 114. For example, a first boss 214 configured to be placed within an opening of the housing may include a cylindrical protrusion from the smaller planar surface of the interior portion 212 of the securing element 114. A second boss 216 configured to be placed within a different opening of the housing may also include a cylindrical protrusion from the smaller planar surface of the interior portion 212 of the securing element 114.

The securing element 114 may include a threaded hole 218 (shown in view 300-2) defined through the exterior portion 210, the interior portion 212, and the second boss 216. The threaded hole 218 may be configured to receive one or more fasteners to secure the securing element 114 and the nosepiece assembly 110 to the housing. Further, the housing may include a threaded hole at which the second boss 216 fits to allow a fastener to secure to the housing. In an aspect, the use of the first boss 214 and the second boss 216 secures and aligns (e.g., prevents rotation, lateral movement) the nosepiece assembly 110 with the housing. Additionally, the chosen lengths and widths of the interior portion 212 and the exterior portion 210 may allow the exterior portion 210 to secure the nosepiece assembly 110 through contact with the lip of the opening 320. While the securing element 114 has been described with respect to specific elements, it should be noted that individual features may be added or replaced. For example, the securing element 114 may include only one boss or no bosses of the first boss 214 and the second boss 216. The securing element may be defined through one portion instead of two (e.g., the interior portion 212 and the exterior portion 210). Additionally, any number of fasteners may be used to secure the nosepiece assembly 110 via the securing element 114.

In order to receive a tail portion of a cable tie, the front portion 310 may include a receiving element 220 (shown in view 300-1) defined through the front portion 310. The receiving element 220 may be defined to have a slotted opening 322 which is an optional side entry to receive the strap with serrations with a width dimension no greater than the width dimension of the exterior planar surface 306 of the front portion 310. The receiving element may additionally include two vertical protrusions 222 (e.g., vertical protrusion 222-1 and vertical protrusion 222-2). The vertical protrusions 222 may extend from the exterior planar surface 306 of the front portion 310. The vertical protrusion 222-1 and vertical protrusion 222-2 may be distanced from one another by a distance of at least a width of a head portion of a cable tie at the exterior planar surface 306. Further, the vertical protrusions 222 may be tapered to a distance from the exterior planar surface 306 of the front portion 310 of the nosepiece assembly 110 such that the two vertical protrusions 22 are greater distanced from one another at a greater distance from the exterior planar surface 306. In an aspect, the tapered vertical protrusions 222 may guide and align the head portion of the cable tie within the receiving element 220.

The nosepiece assembly 110 may also include one or more features that mate with other elements of a tool for severing a cable tie with a round cut. For example, the nosepiece assembly 110 may include a vertical rail 328 (shown in view 300-3) protruding from the interior planar surface 314 of the front portion 310. In aspects, the vertical rail 328 is configured to mate with a channel of the blade member (e.g., channel 206 of blade member 112) to guide the displacement of the blade member. The vertical rail 328 may include a length dimension and a width dimension, which when sized appropriately, allow the vertical rail 328 to be surrounded by the channel of the blade member. In an aspect, the length and width dimension of the vertical rail 328 are slightly smaller than a length and width dimension of the channel of the blade member. Alternatively, the vertical rail 328 may be recessed in the interior planar surface 314. In this implementation, the blade member may contain a protrusion to fit within the recessed vertical rail 328.

The nosepiece assembly 110 may include a cutting support 330 (shown in view 300-3). In some implementations, the cutting support 330 is defined at the interior planar surface 314 of the front portion 310 above the slotted opening 322 of the receiving element 220. In an aspect, the cutting support 330 may protrude from the interior planar surface 314. Alternatively, or in addition, the cutting support 330 may protrude from the bottom planar surface 312 of the upper portion 302. The cutting support 330 may have a perimeter that includes an arc that begins and ends at the interior planar surface 314 of the front portion 310. In an aspect, the arc of the cutting support 330 has a middle defined at a point along the arc equidistant from where the arc begins and ends. Further, the cutting support 330 may have a depth defined as the distance between the interior planar surface 314 and the middle of the arc. The cutting support 330 may be configured to fit within the cutting edge of the blade member (e.g., blade member 112) when the blade member is vertically displaced. Thus, the cutting support 330 may be shaped similarly to the cutting edge of the blade member and have a depth that allows the cutting support 330 to sit within the cutting edge of the blade member. As a result, the cutting support 330 may provide support to the serrated portion of the cable tie when received through the receiving element 220 and allow the blade member to sever the serrated portion of the cable tie in a clean and precise fashion.

Example Blade Member

Figure 4:
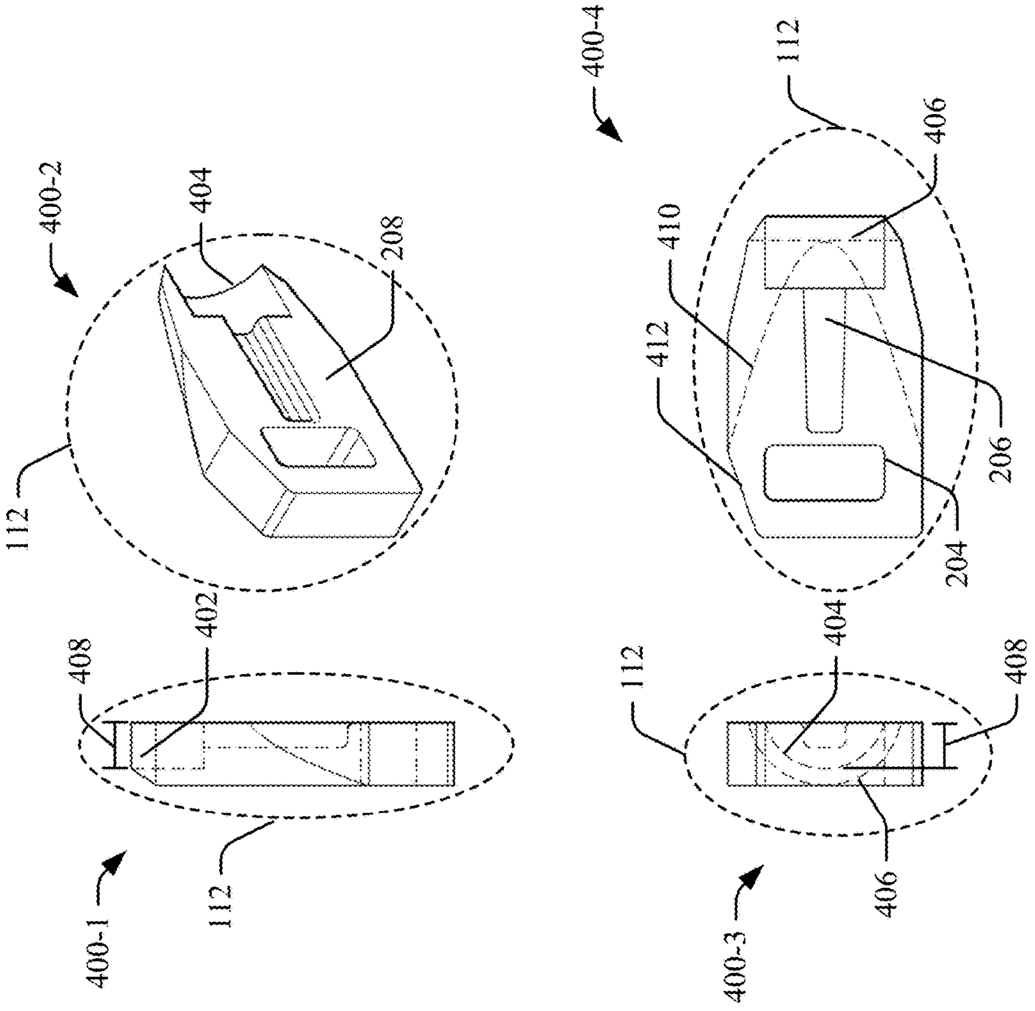
FIG. 4 illustrates example views of a blade member.

FIG. 4 illustrates example views 400 of a blade member 112. View 400-1 illustrates a side view of the blade member 112. In an aspect, the blade member 112 contains a cutting edge 402 (shown in view 400-1). The cutting edge 402 may begin and end at a rear planar surface 208 (shown in view 400-2) of the blade member 112. An example shape of the cutting edge 402 can be the example views 400 of the blade member 112. For example, the cutting edge 402 may contain a sharp curve 404 which begins and ends at the rear planar surface 208. In an aspect, the cutting edge 402 may be tapered from a larger curve 406 (shown in view 400-3) to the sharp curve 404 to produce a robust cutting edge 402. The sharp curve 404 of the cutting edge 402 may additionally be defined by a depth 408 between a middle of the sharp curve 404 and the rear planar surface 208. In implementations that utilize a cutting support (e.g., cutting support 330), the cutting edge 402 may be configured to surround the cutting support when the blade member 112 is displaced vertically. Accordingly, the sharp curve 404 may be shaped similarly to the arc of the cutting support and have a depth 408 greater than that of the cutting support. In this way, the cutting support may sit within the cutting edge 402 when the blade member 112 is displaced.

Further, the blade member 112 may be tapered as shown in view 400-4. In an aspect, the blade member is tapered from a mark 410 to the larger curve 406. In some implementations, the tapered blade member 112 may utilize less material and take up less space within the nosepiece assembly. Further, the tapered blade member 112 may gradually create the cutting edge 402. To provide clarity when orienting the blade member within the nosepiece assembly, a chamfer 412 may be placed on one corner of the blade member 112 to indicate or guide a proper direction to install the blade member 112 or said differently, to guide the direction of the blade member 112 properly during installation in the nosepiece assembly.

The blade member 112 may further utilize features designed to operate in conjunction with other elements of the tool for severing a cable tie with a round cut. For example, the blade member may contain an opening 204 (shown in view 400-4) defined through the blade member 112. In aspects, the opening 204 may be configured to mate with a blade link to vertically displace the blade member 112. For example, the opening 204 of the blade member 112 may be fitted to an end of the blade link. The end of the blade link may be inserted into the opening 204 to displace the blade member 112 vertically when the end of the blade link displaces vertically. The vertical displacement of the blade member 112 may be guided through the use of a channel 206 (shown in view 400-4) configured to mate with a vertical rail of the nosepiece assembly (e.g., vertical rail 328). The channel 206 may be recessed in the rear planar surface 208 of the blade member 112. The channel 206 may be defined by a length dimension and a width dimension. In some implementations, the length and width of the channel 206 may be slightly larger than the length and width of the vertical rail. As a result, the channel 206 may surround the vertical rail and be used to guide the vertical displacement of the blade member 112. In other implementations, the nosepiece assembly may contain a recessed channel. In this implementation, the blade member 112 may contain a vertical rail with a smaller length and width. In this way, the blade member 112 contains a vertical rail that is configured to be surrounded by a channel of the nosepiece assembly to guide the displacement of the blade member 112.

In specific implementations, the sharp curve 404 of the cutting edge 402 may be semi-circular or near semi-circular in shape. In this implementation, the vertical displacement of the blade member may produce a semi-circular or near semi-circular cut along the serrated portion of the cable tie. When using the tool for severing a cable tie with a round cut to produce a semi-circular or near semi-circular cut, it is very important to align the cable tie properly to reduce the possibility of sharp edges which may cause abrasive damage. To this effect, one or more alignment methods may be used to align the cable tie.

Example Alignment Indicator

Figure 5:
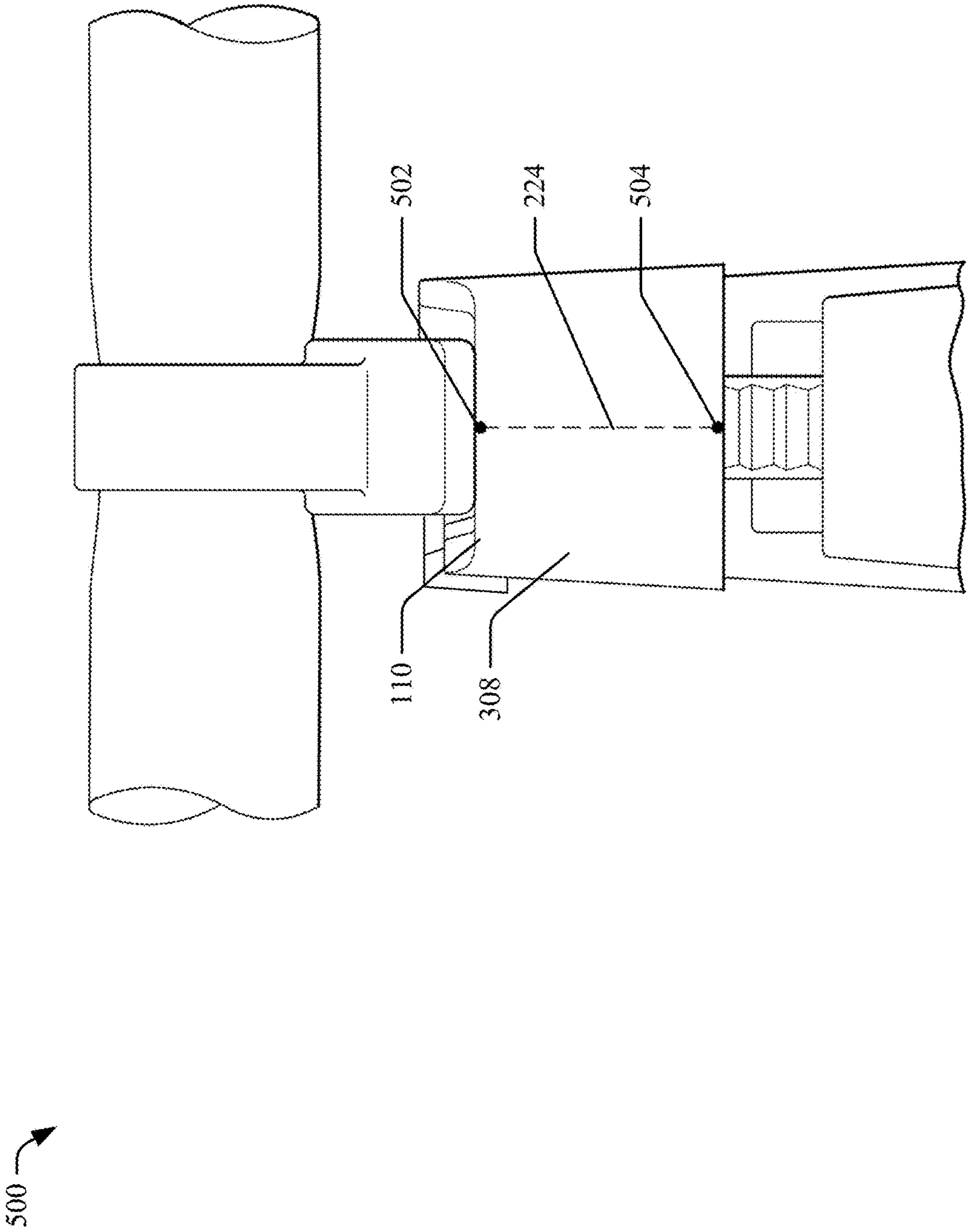
FIG. 5 illustrates an example of an alignment indicator of a nosepiece assembly.

FIG. 5 illustrates an example 500 of an alignment indicator of a nosepiece assembly. An alignment indicator 224 is shown on a top planar surface 308 of a nosepiece assembly 110. A first circle 502 is displayed at a middle of the width dimension of the top planar surface 308. A dotted line extends vertically along the length dimension of the top planar surface 308 to a second circle 504 displayed at a middle of the width dimension of the top planar surface 308. Alternatively, the alignment indicator may be located away from the middle of the width dimension of the top planar surface, but in a manner that aligns a center of the head portion of the cable tie (e.g., the serrated portion).

The alignment indicator 224 may be represented as one or more shapes centered around the dotted line. For example, the alignment indicator 224 may include a line protruded from the top planar surface 308 along the dotted line. The alignment indicator 224 may include a rectangle recessed in the top planar surface 308 centered at the dotted line. The alignment indicator 224 may include two lines equidistant from the dotted line on opposite sides. It is not required that the alignment indicator 224 extend the full-length dimension of the top planar surface 308. Moreover, it should be appreciated that the alignment indicator 224 could be any number of shapes not mentioned, for example, a circle or rhombus. It should also be appreciated that the alignment indicator 224 could be recessed or protruded from the top planar surface 308 of the nosepiece assembly 110. In an aspect, the alignment indicator provides a visual mark that can be used to align the nosepiece assembly 110 with a head portion of the cable tie. As a result, the serrated portion of the cable tie may be aligned within the receiving element (e.g., receiving element 220) and with the blade member 112 to produce a proper cut along the serrated portion of the cable tie. In some implementations, the cut may be a semi-circular or near semi-circular cut.

Example Method

Figure 6:
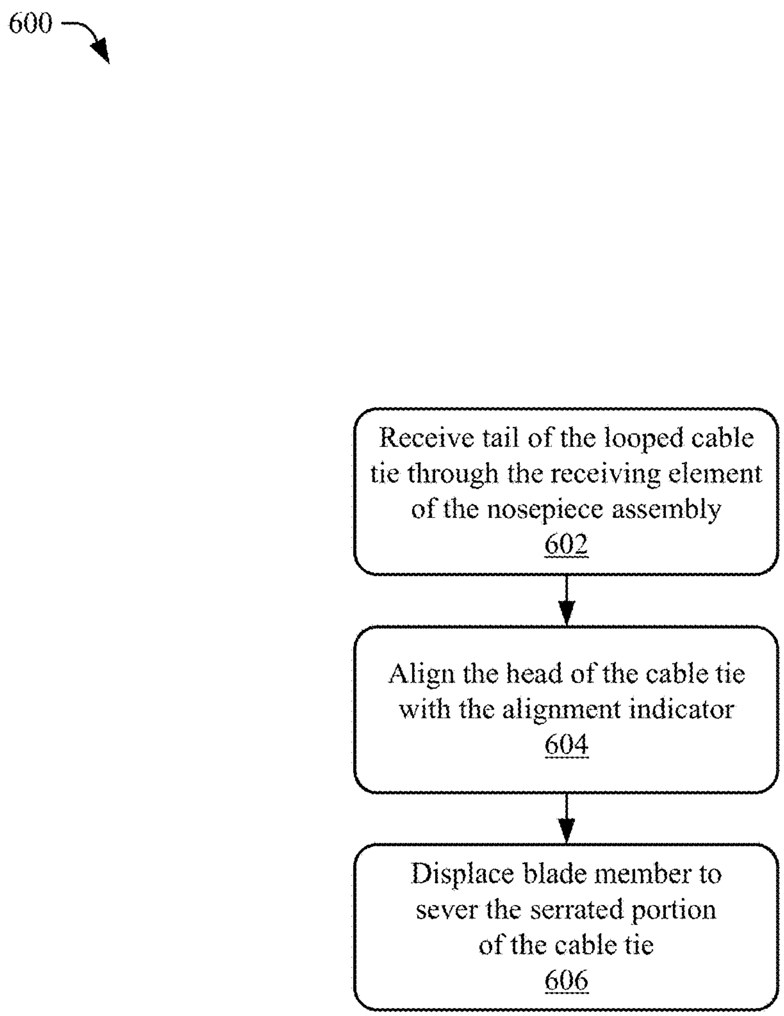
FIG. 6 illustrates a method for severing a cable tie with a round cut, in accordance with the techniques of this disclosure.

FIG. 6 illustrates an example method 600 for severing a cable tie with a round cut. The operations (or steps) of the method 600 include operations 602 through 608; the steps of the method 600 may be performed but are not necessarily limited to the order or combinations in which the operations are shown herein. Further, any of one or more of the operations may be repeated, combined, or reorganized to provide other operations utilizing examples techniques of this disclosure. For ease of description, the method 600 is described in the context of FIG. 1.

At 602 a tail portion of a looped cable tie 104 is placed through the receiving element of the nosepiece assembly 110. For example, a user may position the cable tie severing tool 102 to surround the serrated portion of the looped cable tie 104. In aspects, the tail portion may be received through the nosepiece assembly 110 and the cable tie severing tool 102 may be moved or tensioned (e.g., from a trigger 118) until a head portion of the cable tie 102 is at the nosepiece assembly 110.

At 604, a head portion of the cable tie 104 is aligned with the nosepiece assembly 110 using the alignment indicator 224. For example, the user may use the alignment indicator 224 to align a center of the head portion of the cable tie 104 with the alignment indicator 224. The user may continue to adjust the cable tie severing tool 102 until the head portion of the cable tie 104 is aligned with the alignment indicator 224.

At 606, a blade member 112 is displaced to sever the serrated portion of the cable tie 104 with a round cut at a finite distance from the head portion. For example, the user may move a trigger 118 to actuate a blade link connected to the blade member 112 that displaces the blade member 112 vertically. Alternatively, the cable tie severing tool 102 may be an automatic tool that contains a motor. The user may actuate the motor through a trigger 118 and displace the blade member 112 vertically. In aspects, the round cut is a semi-circular or near semi-circular cut. By severing a cable tie with a round cut using the method 600, or variations thereof, sharp edges on the serrated portion of the cable tie may be reduced or avoided, which may reduce the abrasive damage caused to nearby wires and servicing technicians. Additionally, the cable tie may be severed in a manner that ensures the engagement of multiple serrations due to the distanced cut. This may limit the chance of disengagement of the serrations of the looped cable tie and prevent cable tie failure.

Additional Examples

Some additional examples of severing a cable tie with a rounded cut include:

Example 1: An apparatus comprising: a housing; a nosepiece assembly coupled to the housing, and comprising: an upper portion; a side portion orthogonal to and extending from the upper portion; and a front portion orthogonal to and extending from the upper portion, and comprising: a receiving element configured to receive a tail portion of a cable tie through a slotted opening that has a width of at least a width of the tail portion of the cable tie; and a vertical rail protruding from the front portion and configured to be mated with a channel of a blade member; and the blade member, the blade member configured to produce a rounded cut along a serrated portion of the cable tie at a finite distance from a head portion of the cable tie, the blade member comprising: a rear planar surface that defines the channel that mates with the vertical rail of the nosepiece assembly; and a cutting edge including a sharp curve beginning and ending at the rear planar surface of the blade member.

Example 2: An apparatus as recited by any of the previous examples, wherein the receiving element of the nosepiece assembly further comprises: a cutting support defined as a protrusion from the upper portion of the nosepiece assembly that mates with the cutting edge of the blade member to support the serrated portion when the sharp curve of the cutting edge is severing the cable tie.

Example 3: An apparatus as recited by any of the previous examples, wherein the nosepiece assembly further comprises: an indicator at the upper portion of the nosepiece assembly, the indicator providing an indication of alignment between the nosepiece assembly and the head portion of the cable tie.

Example 4: An apparatus as recited by any of the previous examples, wherein the indicator at the upper portion of the nosepiece assembly comprises a protrusion or recession from the upper portion of the nosepiece assembly.

Example 5: An apparatus as recited by any of the previous examples, wherein the nosepiece assembly is configured to receive a securing element through the side portion of the nosepiece.

Example 6: An apparatus as recited by any of the previous examples, wherein: the nosepiece assembly comprising a first opening configured to receive the securing element within a counterbored hole of the nosepiece assembly, the counterbored hole comprising an outer opening and an inner opening within the outer opening; the securing element configured to be inserted within the first opening of the nosepiece assembly to secure the nosepiece assembly to the housing, the securing element comprising: an exterior portion that fits within the outer opening of the counterbored hole but not the inner opening of the counterbored hole; an interior portion protruding from the exterior portion that fits within the inner opening of the counterbored hole; a first boss comprising a cylindrical protrusion from the interior portion configured to be placed within a first opening of the housing; and a second boss including a different cylindrical protrusion from the interior portion configured to be placed within a second opening of the housing to secure the nosepiece assembly to the housing; and the securing element further configured to receive one or more fasteners at a threaded hole defined through the exterior portion, the interior portion, and the second boss to secure the securing element and the nosepiece assembly to the housing.

Example 7: An apparatus as recited by any of the previous examples, wherein the receiving element of the nosepiece assembly further comprises two vertical sections protruding from the front portion of the nosepiece assembly, the two vertical sections tapered with respect to a distance from the front portion of the nosepiece assembly such that the two vertical sections are greater distanced from one another at a greater distance from the front portion of the nosepiece assembly.

Example 8: An apparatus as recited by any of the previous examples, wherein the blade member is further configured to receive a blade link through a hollowed opening defined through the blade member.

Example 9: An apparatus as recited by any of the previous examples, wherein the sharp curve on the cutting edge of the blade member is or is nearly semi-circular, and the blade member is configured to produce the rounded cut along the serrated portion of the cable tie at the finite distance from the head portion of the cable tie using the sharp curve to produce a near semi-circular cut along the serrated portion of the cable tie at the finite distance from the head portion of the cable tie.

Example 10: An apparatus comprising: a nosepiece assembly configured to be coupled to a housing of a tool for severing a serrated portion of a cable tie with a rounded cut at a finite distance from a head portion of the cable tie, the nosepiece assembly comprising: an upper portion; a side portion orthogonal to and extending from the upper portion; and a front portion orthogonal to and extending from the upper portion, and comprising: a receiving element configured to receive a tail portion of a cable tie through a slotted opening that has a width of at least a width of the tail portion of the cable tie; and a vertical rail protruding from the front portion and configured to be mated with a channel of a blade member.

Example 11: An apparatus as recited by any of the previous examples, wherein the receiving element of the nosepiece assembly further comprises: a cutting support defined as a protrusion from the upper portion of the nosepiece assembly that mates with a cutting edge of the blade member to support the serrated portion when a sharp curve of the cutting edge is severing the cable tie.

Example 12: An apparatus as recited by any of the previous examples, wherein the nosepiece assembly further comprises: an indicator at the upper portion of the nosepiece assembly, the indicator providing an indication of alignment between the nosepiece assembly and the head portion of the cable tie.

Example 13: An apparatus as recited by any of the previous examples, wherein the indicator at the upper portion of the nosepiece assembly comprises a protrusion or recession from the upper portion of the nosepiece assembly.

Example 14: An apparatus as recited by any of the previous examples, wherein the nosepiece assembly is configured to receive a securing element through the side portion of the nosepiece.

Example 15: An apparatus as recited by any of the previous examples, wherein the nosepiece assembly is further configured to receive the securing element at a first opening including a counterbored hole of the nosepiece assembly, the counterbored hole comprising an outer opening and an inner opening within the outer opening; the securing element configured to be inserted within the first opening of the nosepiece assembly to secure the nosepiece assembly to the housing, the securing element comprising: an exterior portion that fits within the outer opening of the counterbored hole but not the inner opening of the counterbored hole; an interior portion protruding from the exterior portion that fits within the inner opening of the counterbored hole; a first boss comprising a cylindrical protrusion from the interior portion configured to be placed within a first opening of the housing; and a second boss including a different cylindrical protrusion from the interior portion configured to be placed within a second opening of the housing to secure the nosepiece assembly to the housing; and the securing element further configured to receive one or more fasteners at a threaded hole defined through the exterior portion, the interior portion, and the second boss to secure the securing element and the nosepiece assembly to the housing.

Example 16: An apparatus as recited by any of the previous examples, wherein the receiving element of the nosepiece assembly further comprises two vertical sections protruding from the front portion of the nosepiece assembly, the two vertical sections tapered with respect to a distance from the front portion of the nosepiece assembly such that the two vertical sections are greater distanced from one another at a greater distance from the front portion of the nosepiece assembly.

Example 17: An apparatus comprising: a blade member configured to produce a rounded cut along a serrated portion of a cable tie at a finite distance from a head portion of the cable tie, the blade member comprising: a rear planar surface having a channel recessed from the rear planar surface that mates with a vertical rail of a nosepiece assembly; and a cutting edge including a sharp curve beginning and ending at the rear planar surface of the blade member.

Example 18: An apparatus as recited by any of the previous examples, wherein the blade member is further configured to receive a blade link through a hollowed opening defined through the blade member.

Example 19: An apparatus as recited by any of the previous examples, wherein the sharp curve on the cutting edge of the blade member is or is nearly semi-circular, and the blade member is configured to produce the rounded cut along the serrated portion of the cable tie at the finite distance from the head portion of the cable tie using the sharp curve to produce a near semi-circular cut along the serrated portion of the cable tie at the finite distance from the head portion of the cable tie.

Example 20: An apparatus as recited by any of the previous examples, wherein the blade member further comprises a chamfered corner to indicate a proper direction to install the blade.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with abrasive damage from severed cable ties can occur in electrical systems and other types of systems. Therefore, although described primarily for ease of description as a way to reduce abrasive damage in electrical systems, the techniques of the foregoing description can be applied to other types systems that include cable ties.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. An apparatus comprising:

a housing;

a nosepiece assembly coupled to the housing, and comprising:

an upper portion;

a side portion orthogonal to and extending from the upper portion; and a front portion orthogonal to and extending from the upper portion, and comprising:

a receiving element configured to receive a tail portion of a cable tie through a slotted opening that has a width of at least a width of the tail portion of the cable tie; and a vertical rail protruding from the front portion and configured to be mated with a channel of a blade member; and the blade member, the blade member configured to produce a rounded cut along a serrated portion of the cable tie at a finite distance from a head portion of the cable tie, the blade member comprising:

a rear planar surface that defines the channel that mates with the vertical rail of the nosepiece assembly; and a cutting edge including a sharp curve beginning and ending at the rear planar surface of the blade member.

2. The apparatus of claim 1, wherein the receiving element of the nosepiece assembly further comprises:

a cutting support defined as a protrusion from the upper portion of the nosepiece assembly that mates with the cutting edge of the blade member to support the serrated portion when the sharp curve of the cutting edge is severing the cable tie.

3. The apparatus of claim 1, wherein the nosepiece assembly further comprises:

an indicator at the upper portion of the nosepiece assembly, the indicator providing an indication of alignment between the nosepiece assembly and the head portion of the cable tie.

4. The apparatus of claim 3, wherein the indicator at the upper portion of the nosepiece assembly comprises a protrusion or recession from the upper portion of the nosepiece assembly.

5. The apparatus of claim 1, wherein the nosepiece assembly is configured to receive a securing element through the side portion of the nosepiece.

6. The apparatus of claim 5, wherein:

the nosepiece assembly comprising a first opening configured to receive the securing element within a counterbored hole of the nosepiece assembly, the counterbored hole comprising an outer opening and an inner opening within the outer opening;

the securing element configured to be inserted within the first opening of the nosepiece assembly to secure the nosepiece assembly to the housing, the securing element comprising:

an exterior portion that fits within the outer opening of the counterbored hole but not the inner opening of the counterbored hole;

an interior portion protruding from the exterior portion that fits within the inner opening of the counterbored hole;

a first boss comprising a cylindrical protrusion from the interior portion configured to be placed within a first opening of the housing; and a second boss including a different cylindrical protrusion from the interior portion configured to be placed within a second opening of the housing to secure the nosepiece assembly to the housing; and the securing element further configured to receive one or more fasteners at a threaded hole defined through the exterior portion, the interior portion, and the second boss to secure the securing element and the nosepiece assembly to the housing.

7. The apparatus of claim 1, wherein the receiving element of the nosepiece assembly further comprises two vertical sections protruding from the front portion of the nosepiece assembly, the two vertical sections tapered with respect to a distance from the front portion of the nosepiece assembly such that the two vertical sections are greater distanced from one another at a greater distance from the front portion of the nosepiece assembly.

8. The apparatus of claim 1, wherein the blade member is further configured to receive a blade link through a hollowed opening defined through the blade member.

9. The apparatus of claim 1, wherein the sharp curve on the cutting edge of the blade member is or is nearly semi-circular, and the blade member is configured to produce the rounded cut along the serrated portion of the cable tie at the finite distance from the head portion of the cable tie using the sharp curve to produce a near semi-circular cut along the serrated portion of the cable tie at the finite distance from the head portion of the cable tie.

* * * * *